(12) United States Patent
Grzybek

(10) Patent No.: US 12,099,834 B2
(45) Date of Patent: Sep. 24, 2024

(54) PATCHING SOFTWARE DEPENDENCIES USING EXTERNAL METADATA

(71) Applicant: Red Hat, Inc., Raleigh, NC (US)

(72) Inventor: Grzegorz Grzybek, Warsaw (PL)

(73) Assignee: Red Hat, Inc., Raleigh, NC (US)

( * ) Notice: Subject to any disclaimer, the term of this patent is extended or adjusted under 35 U.S.C. 154(b) by 42 days.

(21) Appl. No.: 17/383,822

(22) Filed: Jul. 23, 2021

(65) Prior Publication Data
US 2023/0025526 A1 Jan. 26, 2023

(51) Int. Cl.
*G06F 8/71* (2018.01)
*G06F 8/65* (2018.01)
*G06F 21/57* (2013.01)

(52) U.S. Cl.
CPC .......... *G06F 8/71* (2013.01); *G06F 8/65* (2013.01); *G06F 21/577* (2013.01)

(58) Field of Classification Search
CPC . G06F 8/71; G06F 8/65; G06F 21/577; G06F 8/41; G06F 8/60; G06F 8/36; G06F 11/3664; G06F 8/433; G06F 16/1873
See application file for complete search history.

(56) References Cited

U.S. PATENT DOCUMENTS

| | | | |
|---|---|---|---|
| 8,745,585 B2 | 6/2014 | Watters et al. | |
| 10,754,755 B2 | 8/2020 | Creel et al. | |
| 2016/0292066 A1* | 10/2016 | Stevens | G06F 11/3624 |
| 2017/0109156 A1* | 4/2017 | Hong | G06F 8/656 |
| 2019/0052665 A1* | 2/2019 | Mahieu | G06N 5/048 |
| 2020/0202006 A1* | 6/2020 | Shah | G06F 8/433 |
| 2021/0271466 A1* | 9/2021 | Sridhara | G06F 8/65 |
| 2022/0156053 A1* | 5/2022 | Shaastry | G06F 8/433 |
| 2022/0318395 A1* | 10/2022 | Janakiraman | G06F 21/577 |
| 2022/0318396 A1* | 10/2022 | Deng | G06F 21/577 |
| 2022/0385535 A1* | 12/2022 | Verma | H04L 41/0886 |

FOREIGN PATENT DOCUMENTS

| | | |
|---|---|---|
| CN | 111783103 A | 10/2020 |
| CN | 111897570 A | 11/2020 |
| CN | 112181858 A | 1/2021 |

OTHER PUBLICATIONS

Ramaswamy Chandramouli; Security Strategies for Microservices-based Application Systems; NIST Special Publication; 50 pages; retrieved on May 2, 2024 (Year: 2019).*
Baeldung, "Spring with Maven BOM", Last modified: Aug. 6, 2020, 5 Pages.
Baeldung, "How to Resolve a Version Collision of Artifacts in Maven"; Last modified: Jul. 22, 2020, 6 Pages.
Thefashionandcity, "Maven Override Transitive Dependency Version", Feb. 24, 2021, 4 Pages.

* cited by examiner

*Primary Examiner* — S. Sough
*Assistant Examiner* — Cuong V Luu
(74) *Attorney, Agent, or Firm* — Kilpatrick Townsend & Stockton LLP

(57) ABSTRACT

New and innovative systems and methods for patching software dependencies using external metadata are provided. In an example, a computer-implemented method, includes obtaining source code and build metadata including a plurality of dependencies, obtaining patch data, updating the build metadata to replace at least one dependency in the plurality of dependencies based on the patch data, generating output data based on the source code and the updated build metadata, generating summary data for the updated build metadata, and providing the generated summary data.

17 Claims, 6 Drawing Sheets

PATCHING SOFTWARE DEPENDENCIES USING EXTERNAL METADATA

BACKGROUND

Computer systems may run workloads (e.g., applications or services) provided via a server or cloud. The applications or services may be generated by compiling source code files into executable software and/or libraries that can be executed on the computer systems.

SUMMARY

The present disclosure provides new and innovative systems and methods for patching software dependencies using external metadata. In an example, a computer-implemented method, includes obtaining source code and build metadata including a plurality of dependencies, obtaining patch data, updating the build metadata to replace at least one dependency in the plurality of dependencies based on the patch data, generating output data based on the source code and the updated build metadata, generating summary data for the updated build metadata, and providing the generated summary data.

In an example, a computer-implemented method includes obtaining, from a data repository server system, source code, build metadata, and patch data, the build metadata including a plurality of dependencies and the patch data including an indication of a plurality of updated dependencies and binary copies of the plurality of updated dependencies, updating the build metadata to replace at least one dependency in the plurality of dependencies based on the patch data, generating output data based on the source code, the updated build metadata, and the binary copies of the dependencies indicated in the updated build metadata, and providing a service based on the output data.

In an example, an apparatus includes a processor and a memory in communication with the processor and storing instructions that, when executed by the processor, cause the apparatus to obtain source code and build metadata including a plurality of dependencies, obtain patch data, update the build metadata to replace at least one dependency in the plurality of dependencies based on the patch data, generate output data based on the source code and the updated build metadata, and provide a service based on the output data.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

The description will be more fully understood with reference to the following figures, which are presented as exemplary aspects of the disclosure and should not be construed as a complete recitation of the scope of the disclosure, wherein.

DETAILED DESCRIPTION

Figure 1:
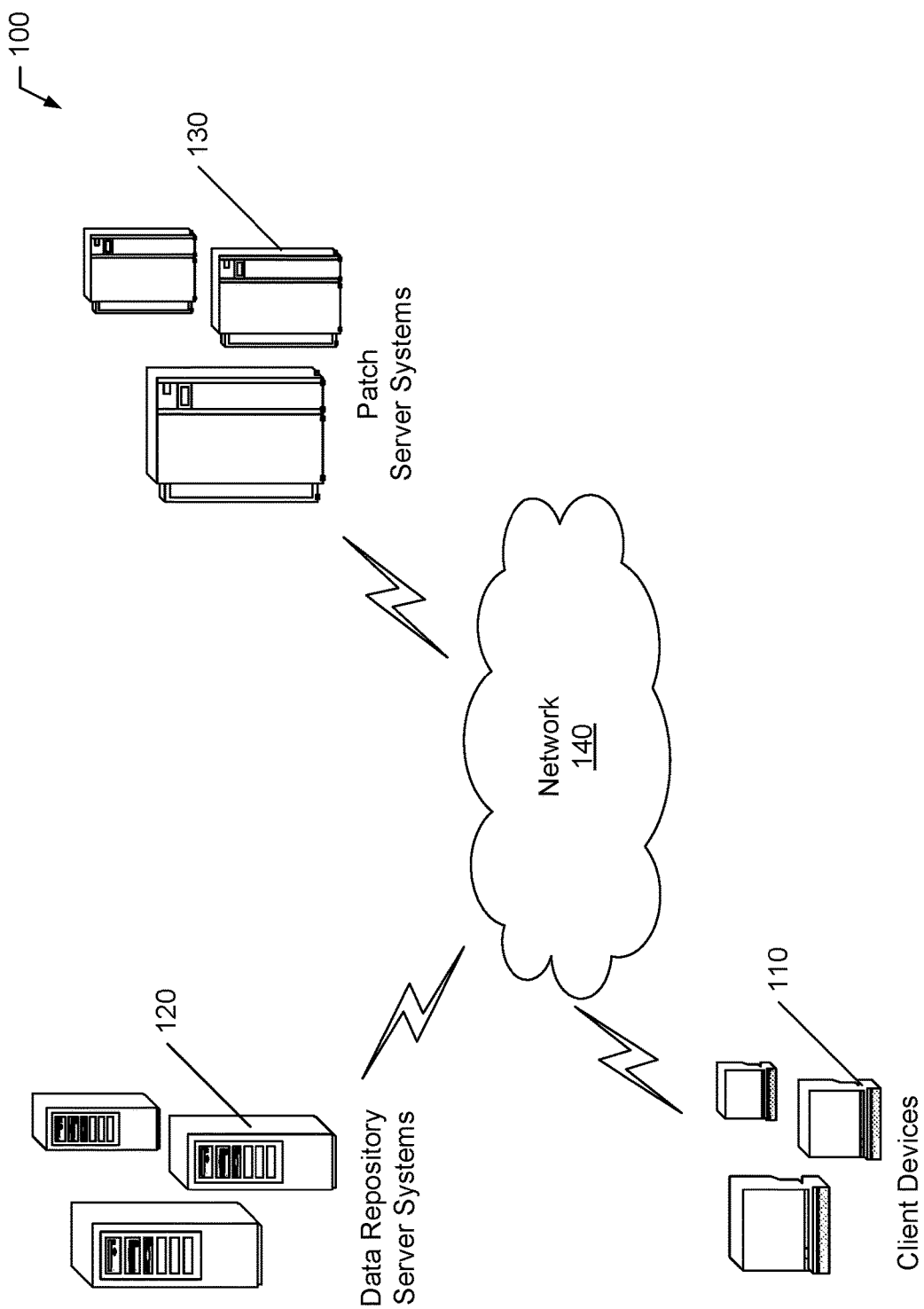
FIG. 1 illustrates a block diagram of an example computing system according to an example aspect of the present disclosure.

Turning now to the drawings, techniques are disclosed for new and innovative systems and methods for patching software dependencies using external metadata. Computing systems can provide a variety of services and/or applications and these services and applications are generated by compiling source code and its dependencies for a project. In many systems, build metadata (such as a bill of materials (BOM) or project object model (POM)) is utilized to manage the various source code files, dependencies, and/or any other data related to the build process for the applications and/or services. The build metadata can specify how to build a single version of the application and/or service and/or can describe how to build many different versions of the application and/or service.

A dependency can include source code and/or object code (e.g. executable programs, libraries, and the like) that are utilized by the service and/or application but are a separate project. That is, a dependency can be a reusable artifact utilized in the project but not created as part of the project itself. The dependencies can include a name, an identifier, a version number, a location (e.g. a URL) where files associated with the dependency can be obtained, compatibility data indicating which versions of a dependency are compatible with each other, and/or any other data related to the dependencies. A particular version of a dependency can have a variety of errors and/or security flaws, such as common vulnerabilities and exposures that are publicly published by security researchers. These errors and/or security flaws can be patched in later version(s) of the dependency. In order to update a project to address an error and/or security flaw, existing systems typically need to be completely rebuilt with the updated dependency in order to incorporate the updated dependency into the project. Existing systems also typically require manual review of the dependencies of a project to identify dependencies that need to be updated to address particular errors and/or flaws.

Systems and methods in accordance with aspects of the disclosure can automatically identify dependencies in the build metadata that have identified errors and/or security flaws and automatically replace the identified dependencies with updated versions that correct the identified errors and/or security flaws. In several aspects, every version of a project maintained in the build metadata can be built using improved libraries, improving performance and security of the computing systems providing the applications and/or services generated by the project. Additionally, only a portion of a project utilizing the updated dependencies can be built and/or redeployed without the need to rebuild the entire project, improving the efficiency of the computing systems.

A variety of computing systems and processes for patching software dependencies using external metadata in accordance with aspects of the disclosure are described in more detail herein.

Computing Systems

FIG. 1 depicts a high-level component diagram of an example computing system 100 in accordance with one or more aspects of the present disclosure. The computing system 100 can include client devices 110, data repository server systems 120, and patch server systems 130 in communication via network 140. In many aspects, the data repository server systems 120 and/or patch server systems 130 are implemented using a single server. In a variety of aspects, the data repository server systems 120 and/or patch server systems 130 are implemented using a plurality of servers. In several aspects, client devices 110 are implemented utilizing the data repository server systems 120 and/or patch server systems 130. In a variety of aspects, data repository server systems 120 and/or patch server systems is implemented using the client device 110.

Client devices 110 can obtain a variety of data, such as source code, build metadata (e.g. a bill of materials, a project object model, and the like), patch data, and/or any other data as utilized in the generation of output data as described herein. Client devices 110 can generate output data based on the obtained data and/or provide one or more services based on the generated output data as described herein. In a variety of aspects, the client devices 110 transmit the output data to a third-party server system that provides one or more services based on the output data as described herein. Data repository server systems 120 can store source code and/or build metadata and transmit source code and/or build metadata on request as described herein. Patch server systems 130 can store patch data and/or updated dependencies and/or transmit patch data and/or updated dependencies to one or more computing devices, such as client devices 110 and/or data repository server systems 120, as described herein.

Any of the computing devices shown in FIG. 1 (e.g. client devices 110, data repository server systems 120, and patch server systems 130) can include a single computing device, multiple computing devices, a cluster of computing devices, and the like. A computing device can include one or more physical processors communicatively coupled to memory devices, input/output devices, and the like. As used herein, a processor may also be referred to as a central processing unit (CPU). Additionally, as used herein, a processor can include one or more devices capable of executing instructions encoding arithmetic, logical, and/or I/O operations. In one illustrative example, a processor may implement a Von Neumann architectural model and may include an arithmetic logic unit (ALU), a control unit, and a plurality of registers. In many aspects, a processor may be a single core processor that is typically capable of executing one instruction at a time (or process a single pipeline of instructions) and/or a multi-core processor that may simultaneously execute multiple instructions. In a variety of aspects, a processor may be implemented as a single integrated circuit, two or more integrated circuits, and/or may be a component of a multi-chip module in which individual microprocessor dies are included in a single integrated circuit package and hence share a single socket. As discussed herein, a memory refers to a volatile or non-volatile memory device, such as RAM, ROM, EEPROM, or any other device capable of storing data. Input/output devices can include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In several aspects, a computing device provides an interface, such as an API or web service, which provides some or all of the data to other computing devices for further processing. Access to the interface can be open and/or secured using any of a variety of techniques, such as by using client authorization keys, as appropriate to the requirements of specific applications of the disclosure.

The network 140 can include a LAN (local area network), a WAN (wide area network), telephone network (e.g. Public Switched Telephone Network (PSTN)), Session Initiation Protocol (SIP) network, wireless network, point-to-point network, star network, token ring network, hub network, wireless networks (including protocols such as EDGE, 3G, 4G LTE, Wi-Fi, 5G, WiMAX, and the like), the Internet, and the like. A variety of authorization and authentication techniques, such as username/password, Open Authorization (OAuth), Kerberos, SecureID, digital certificates, and more, may be used to secure the communications. It will be appreciated that the network connections shown in the example computing system 100 are illustrative, and any means of establishing one or more communications links between the computing devices may be used.

Project Build Overview

As described herein, applications and/or services can be generating by executing a build process according to a set of procedures for a project defined in one or more pieces of build metadata. The build metadata can indicate a number of different versions of a project, and each version of the projects can have its own source code files, dependencies, requirements, and the like. However, these dependencies may have errors and/or security flaws that can result in the generated applications and/or services having bugs and/or security vulnerabilities. In order to address these and other issues, systems and methods in accordance with aspects of the disclosure can automatically update the build metadata to utilize updated dependencies that correct these bugs and/or security flaws. In this way, a particular version of the generated applications and/or services can be automatically updated to address these bugs and/or security flaws.

Figure 2:
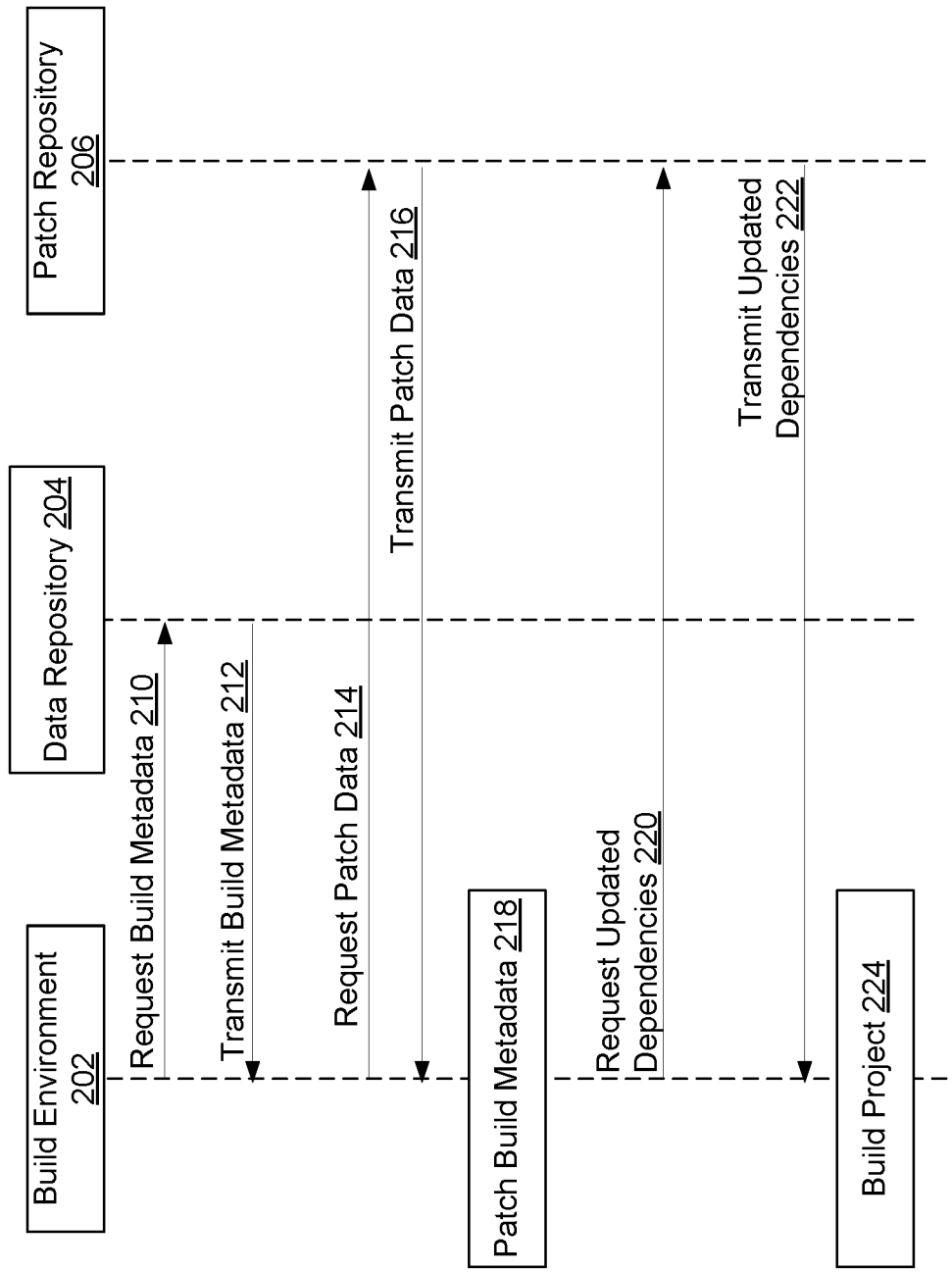
FIG. 2 illustrates a flow diagram of data within an example computing system according to an example aspect of the present disclosure.

FIG. 2 illustrates a flow diagram of a build process within an example system according to an example aspect of the present disclosure. Although the example data flow 200 is described with reference to the flow diagram illustrated in FIG. 2, it will be appreciated that many other methods of performing the acts associated with the process 200 may be used. For example, the order of some of the blocks may be changed, certain blocks may be combined with other blocks, one or more blocks may be repeated, and some of the blocks described are optional. The process 200 may be performed by processing logic that may include hardware (circuitry, dedicated logic, etc.), software, or a combination of both.

In the illustrated example process 200, a build environment 202 can request (210) build metadata for a project from a data repository 204. The build environment 202 can include any environment provided by a computing device that can be used to build one or more versions of a project based on the build metadata, such as a client device as described herein. The different versions of a project can have different features, utilize different source code files, utilize different dependencies, be deployed in different environment (e.g. deployed locally, on a cloud-based service provider such as Amazon Web Services, Microsoft Azure, Google Cloud, and the like, on a third-party server system, and/or any other environment), and the like. In many aspects the build metadata is a model implemented using a language such as, but not limited to, JavaScript Object Notation or the Extensible Markup Language, that contains indications of the source code files, configuration files, developers and/or developer roles, defect tracking systems, organizations, licenses, a location (e.g. a uniform resource locator (URL)) of where the project is hosted, the project's dependencies, an identifier for the build metadata, a version of the build metadata, and/or any other data related to and/or used to build (e.g. compile) the project. In several aspects, the build metadata indicates relationships between itself and other pieces of build metadata such that the build metadata can inherit from parent build metadata and/or be combined with other pieces of build metadata.

The data repository 204 can include any computing device, such as a data repository server system, that stores build metadata and/or data referenced in the build metadata, such as source code, as described herein. The data repository 204 can transmit (212) build metadata to the build environment 202. The build environment 202 can request (214) patch data from a patch repository 206. In a variety of aspects, the patch data includes a model implemented using a language such as, but not limited to, JavaScript Object Notation or the Extensible Markup Language that specifies the dependencies that should be replaced during the build process. The patch repository 206 can store patch data identifying a variety of dependencies, the version of those dependencies, and/or errors and/or security flaws corrected in a particular version of a dependency as described herein. The patch repository 206 can be implemented using any computing device, such as a patch server system, as described herein. The patch repository 206 can transmit (216) the patch data to the build environment 202.

At block 218, the build environment can patch the build metadata using the patch data. In many aspects, patching the build metadata includes determining a particular version of a project to be built, determining one or more dependencies associated with the particular version of the project, and determining updated versions of the determined dependencies that address one or more errors and/or security flaws in the version of the dependencies indicated for the particular version of the project. In several aspects, patching the build metadata includes replacing a portion of the build metadata identifying a particular dependency with a corresponding portion of the patch metadata identifying the updated version of the dependency. For example, a dependency may be indicated by a <dependency id='1234' version='1.0'> and corresponding </dependency> element within build metadata formatted using XML. Patching the build metadata can include identifying a <dependency> element within the patch data having id='1234' and a version greater than 1.0 and indicated as compatible with version 1.0 in the patch data, such as <dependency id='1234' version='1.6'>. The identified element in the patch data can replace the <dependency id='1234' version='1.0'> element within the build metadata with the element <dependency id='1234' version='1.6'> in the updated build metadata.

The build environment 202 can request (220) updated dependencies from the patch repository 206. The patch repository can transmit (222) the updated dependencies to the build environment 202. The updated dependencies can include the source code and/or object code for a particular version of the dependency as described herein. In a number of aspects, the patch repository 206 stores various versions of the dependencies. However, it should be noted that the updated dependencies can be requested and/or transmitted from any computing device, such as a third-party computing device associated with a URL for the dependency, as appropriate.

At block 224, the build environment 202 can build the project. Building the project can include executing one or more build automation tools (such as Apache Maven, make, Apache Ant, MSBuild, and the like) to perform the build processes defined in the patched build metadata. The build processes can include creating directory structures including one or more folders, compiling source code, storing compiled executable files and/or library code within the folders, storing the dependencies within the folders, packaging the data within an archive file (such as a java archive, a tape archive, and/or any other archive format), and/or any other steps as appropriate.

Specific build processes in accordance with aspects of the disclosure are described with respect to FIG. 2; however, any of variety of processes, including those where a single computing device provides the build environment, the data repository, and/or the patch repository, can be utilized as appropriate.

Patching Dependencies

Figure 3:
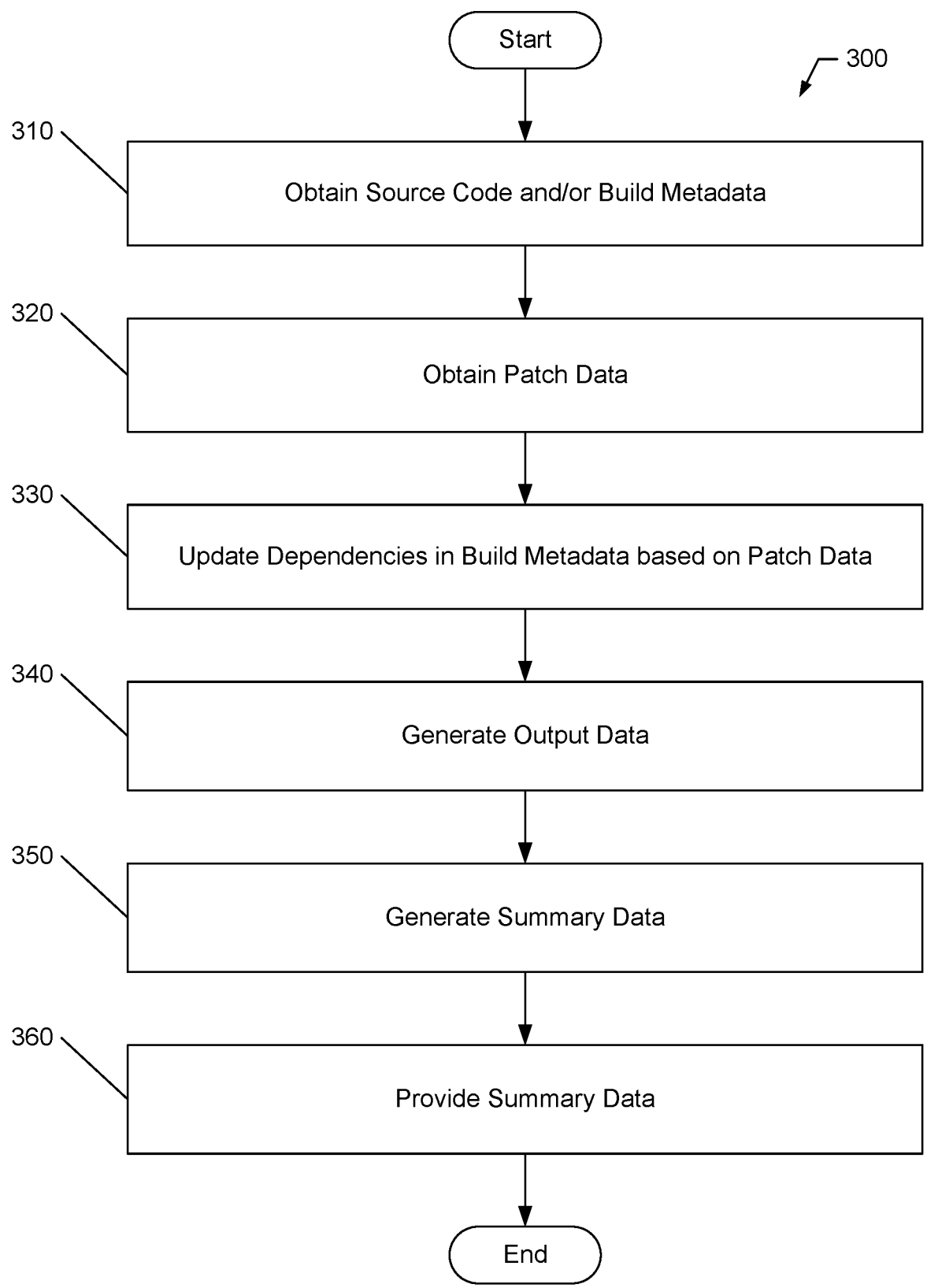
FIG. 3 illustrates a flowchart of a process for generating output data according to an example aspect of the present disclosure.

FIG. 3 illustrates a flowchart of a process for generating output data according to an example aspect of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, one or more blocks may be repeated, and some of the blocks described are optional. The process 300 may be performed by processing logic that may include hardware (circuitry, dedicated logic, etc.), software, or a combination of both.

Source code and/or build metadata can be obtained (block 310). The source code and/or build metadata can be associated with a particular application and/or service. In several aspects, the source code can be included in the build metadata. The build metadata can indicate one or more versions of a project such that when the actions defined in the build metadata are performed (such as by executing a build automation tool), a particular version of the application and/or service is built (e.g. compiled) as described herein. For each version of the project, the build metadata can indicate one or more dependencies, each dependency having an associated version.

Patch data can be obtained (block 320). The patch data can indicate a variety of dependencies and different versions of the dependencies. In many aspects, the patch data indicates which versions of a particular dependency are compatible. For example, a dependency may have four versions—1.0, 1.1, 2.0, and 3.0. Versions 1.0 and 1.1 may be compatible, while versions 2.0 and 3.0 may be incompatible with each other, version 1.0, and version 1.1. In several aspects, the patch data indicates version ranges that are compatible. For example, the patch data can indicate that version 1.0 is compatible with any version beginning with 1.XX (e.g. 1.0-1.99 are compatible) and any version beginning with 2 is compatible (e.g. 2.0-2.99 are compatible), but versions outside of those ranges are not compatible (e.g. version 1.27 is not compatible with version 2.1, and version 2.87 is not compatible with version 1.90). The patch data can also indicate any errors and/or security flaws are addressed in a particular version of a dependency. For example, the patch data can indicate a common vulnerability and exception (CVE). In a number of aspects, a CVE includes an identifier and/or a URL that references a database describing the CVE. In this way, when a CVE is identified, a corresponding dependency that corrects the issues identified in the CVE can be located within the patch data.

Dependencies in the build metadata can be updated based on the patch data (block 330). Dependencies in the build metadata can be replaced based on a newer (and/or compatible) version of the dependency being identified in the patch data. In several aspects, each dependency indicated in the build metadata is compared to the versions available in the patch data to automatically update each dependency having a newer compatible version. In a variety of aspects, the dependencies to be updated in the build metadata are determined based on a particular CVE, dependency name, and/or any other criteria as appropriate. The build metadata can be updated with the corresponding data from the patch data in order to update the dependencies as described herein.

Output data can be generated (block 340). The output data can be generated by performing the actions indicated in the updated (e.g. patched) build metadata. Generating the output data can include compiling source code, obtaining copies of the dependencies indicated in the updated build metadata, and packaging the compiled source code and dependencies into the output data. In many aspects, the actions of the build metadata are performed by executing a build automation tool to process the build metadata, obtain the indicated dependencies, compile any source code, and generate the desired output data (e.g. files, directory structure, archive files, and the like) as described herein. The output data can be used to provide one or more applications and/or services as described herein. In several aspects, the output data includes the entire application and/or service. In a number of aspects, the output data includes a portion of the application and/or service. For example, the output data can include an update to a particular microservice of an application having a service-based architecture or a microservices architecture. The updated microservice can be deployed to update the application without having to redeploy the entire application, and as the updated microservice was generated based on dependencies that have been identified as compatible with the original version of the microservice, the existing microservice can be updated (e.g. replaced with the updated microservice) with little to no risk of breaking the application itself. In this way, the output data can be used to update existing applications and/or services to correct errors and/or security flaws without redeploying (and/or retesting) the entire application and/or service.

Summary data can be generated (block 350). The summary data can indicate which dependencies were replaced in the build metadata, any errors and/or security flaws (e.g. CVEs) addressed by patching the build metadata, the results of the build process, and/or any other data as appropriate. In many aspects, the summary data includes a reference (e.g. a URL) to a third-party website providing additional information regarding the CVEs. The summary data can be provided (block 360). The summary data can be provided by a variety of communication channels. In several aspects, the summary data can be formatted as a web page and provided via a web site. In a variety of aspects, the summary data can be provided as a push notification to one or more computing devices. In many aspects, the summary data can be included as an output of a build automation tool. In a number of aspects, the summary data can be included in a log file generated during the generation of the output data.

Figure 4:
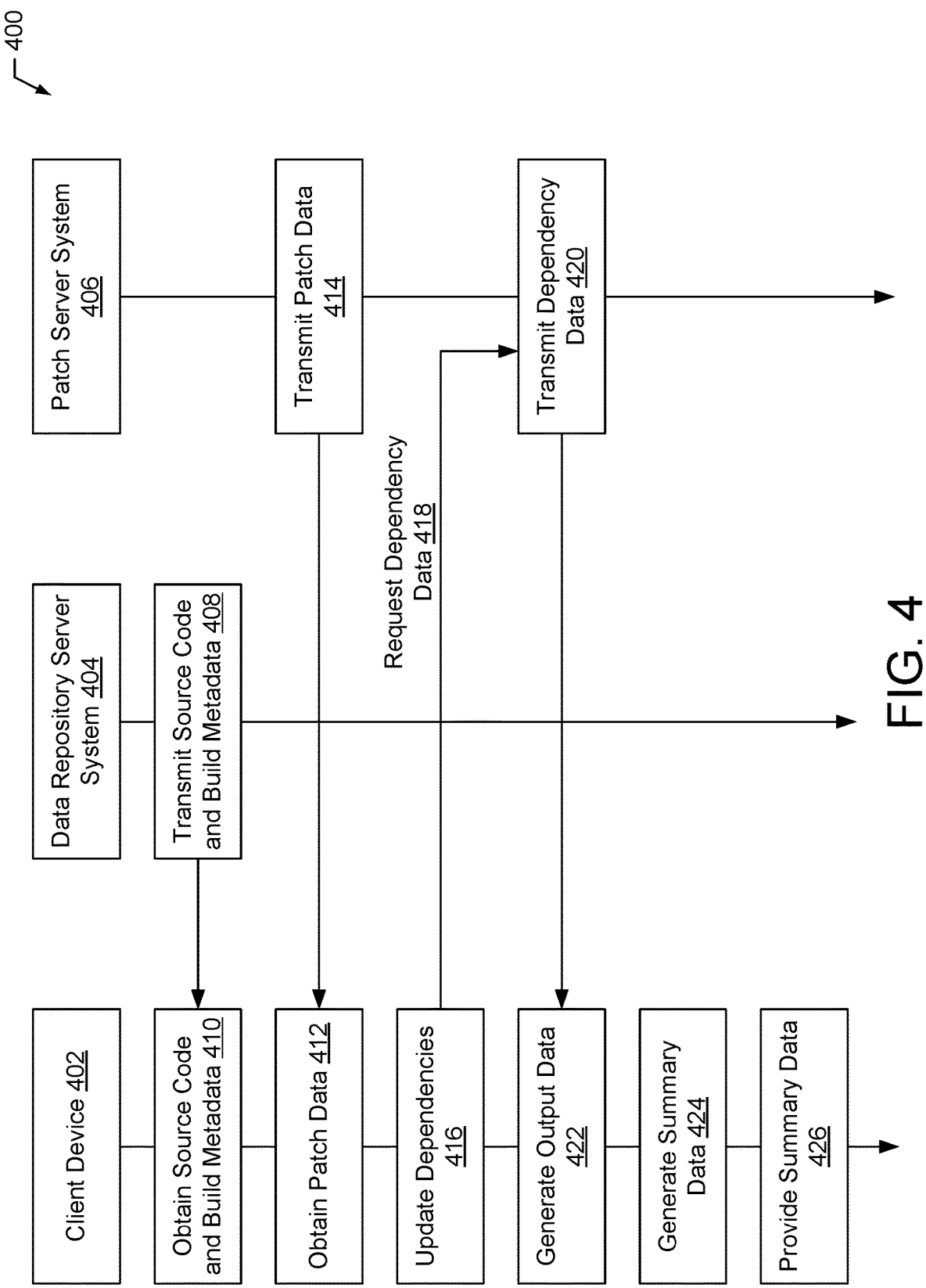
FIG. 4 illustrates a flow diagram of a process for generating output data according to an example aspect of the present disclosure.

In a variety of aspects, the patch data and/or dependencies are maintained by a patch server system operating independently of the systems hosting the projects and/or generating the output data. FIG. 4 illustrates a flow diagram of a process for generating output data according to an example aspect of the present disclosure. Although the process 400 is described with reference to the flow diagram illustrated in FIG. 4, it will be appreciated that many other methods of performing the acts associated with the process 400 may be used. For example, the order of some of the blocks may be changed, certain blocks may be combined with other blocks, one or more blocks may be repeated, and some of the blocks described are optional. For example, the data repository server system 404 can perform the functions of the patch server system 406 and/or the dependency data can be provided by a third-party server system instead of the patch server system 406.

A data repository server system 404 can transmit source code and/or build metadata to a client device 402 at block 408. In a number of aspects, the data repository server system 404 transmits the source code and/or build metadata based on a request provided by the client device 402. At block 410, the client device 402 can obtain the source code and the build metadata. In several aspects, the source code is included in the build metadata. In a variety of aspects, the source code is not transmitted as either the source code is already present on the client device 402 and/or there is no source code associated with the projects indicated in the build metadata.

At block 414, a patch server system 406 can transmit patch data to the client device 402. In several aspects, the patch server system 406 transmits the patch data based on a request provided by the client device 402. In a variety of aspects, the patch server system 406 transmits the patch data to the data repository server system 404 and the data repository server system 404 transmits the patch data to the client device 402.

At block 416, the client device 402 can update one or more dependencies in the build metadata. The dependencies in the build metadata can be updated based on updated, compatible versions of the dependencies being indicated in the patch data as described herein. The client device 402 can request (418) dependency data from the patch server system 406. The requested dependency data can include the data files for the dependencies updated in the build metadata. These files can include object code, executable file(s), library file(s), and/or any other data as described herein. At block 420, the patch server system 406 can transmit the dependency data to the client device 402.

At block 422, the client device 402 can generate output data. The output data can be generated by performing actions indicated in the updated build metadata as described herein. In many aspects, the output data can be used by the client device 402 to provide one or more applications and/or services. In a variety of aspects, the client device 402 can transmit the output data to one or more third-party systems, such as cloud-based service providers, to provide the one or more applications and/or services as described herein. At block 424, the client device 402 can generate summary data indicating one or more errors and/or security flaws addressed by updating the dependencies in the build data as described herein. At block 426, the client device 402 can provide the summary data as described herein.

Figure 5:
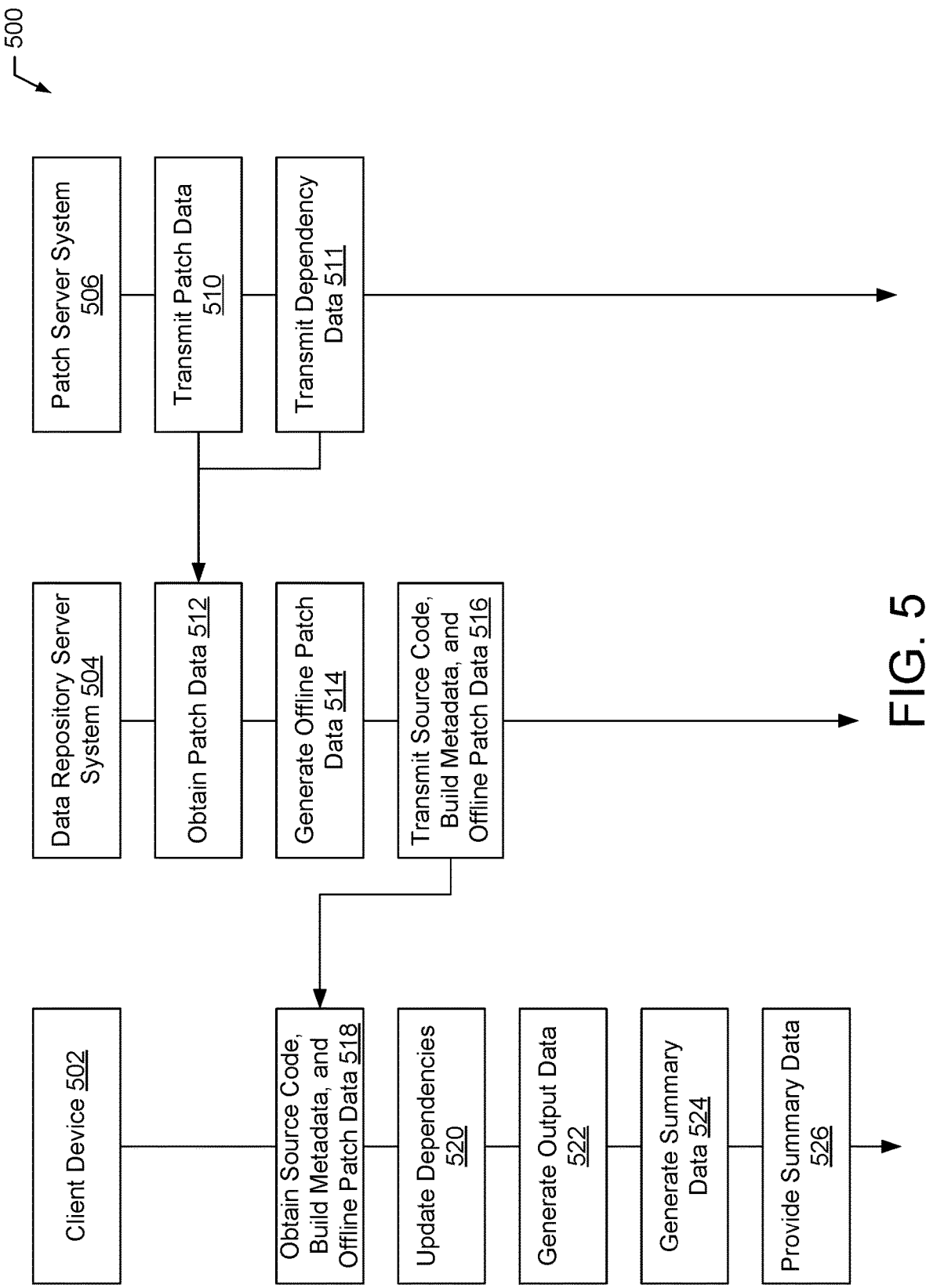
FIG. 5 illustrates a flow diagram of a process for generating output data for offline systems according to an example aspect of the present disclosure.

In many aspects, the output data is generated by a computing device that operates without access to remote systems, such as data repository server systems and/or patch server systems. In these instances, the computing device can obtain the necessary build metadata, patch data, and dependencies and utilize the locally stored information to generate output data. FIG. 5 illustrates a flow diagram of a process for generating output data for offline systems according to an example aspect of the present disclosure. Although the example process 500 is described with reference to the flow diagram illustrated in FIG. 5, it will be appreciated that many other methods of performing the acts associated with the process 500 may be used. For example, the order of some of the blocks may be changed, certain blocks may be combined with other blocks, one or more blocks may be repeated, and some of the blocks described are optional. For example, the data repository server system 504 can perform the functions of the patch server system 506 and/or the dependency data can be provided by a third-party server system instead of the patch server system 506.

A patch server system 506 can transmit patch data at block 510 and transmit dependency data at block 511 to a data repository server system 504. In many aspects, the dependency data may be transmitted by a third-party server system hosting the dependency data. At block 512, the data repository server system 504 can obtain the patch data and dependency data. At block 514, the data repository server system 504 can generate offline patch data. The offline patch data can include the patch data and the dependency data. In several aspects, the offline patch data can be any of a variety of archive files, such as Java archives, tape archives, ZIP files, and/or any other archive file. At block 516, the data repository server system can transmit source code, build metadata, and/or the offline patch data to a client device 502. In a number of aspects, the data repository server system 504 transmits the data based on a request provided by the client device 502. In several aspects, the patch server system 506 generates the offline patch data. The patch server system can transmit the offline patch data directly to client device 502 and/or to data repository server system 504.

At block 518, the client device 502 can obtain the source code, build metadata, and/or offline patch data. Although process 500 shows the source code, build metadata, and offline patch data being provided by the data repository server system 504, it should be noted that, in a number of aspects, the source code, build metadata, and offline patch data are loaded directly onto the client device via one or more computer-readable media, such as a flash drive, rather than being transmitted via a computer network. In several aspects, the source code is included in the build metadata. In a variety of aspects, the source code is not transmitted as either the source code is already present on the client device 502 and/or there is no source code associated with the projects indicated in the build metadata. At block 520, the client device 502 can update one or more dependencies in the build metadata. The dependencies in the build metadata can be updated based on updated, compatible versions of the dependencies being indicated in the patch data as described herein. In process 500, the dependency data for the updated dependencies can be obtained from the offline patch data. In this way, the offline patch data provides the data used to generate output data without having to access any remote systems. At block 522, the client device 502 can generate output data. The output data can be generated by performing actions indicated in the updated build metadata as described herein. In many aspects, the output data can be used by the client device 502 to provide one or more applications and/or services. In a variety of aspects, the client device 502 can transmit the output data to one or more third-party systems, such as cloud-based service providers, to provide the one or more applications and/or services as described herein. At block 524, the client device 502 can generate summary data indicating one or more errors and/or security flaws addressed by updating the dependencies in the build data as described herein. At block 526, the client device 502 can provide the summary data as described herein.

Figure 6:
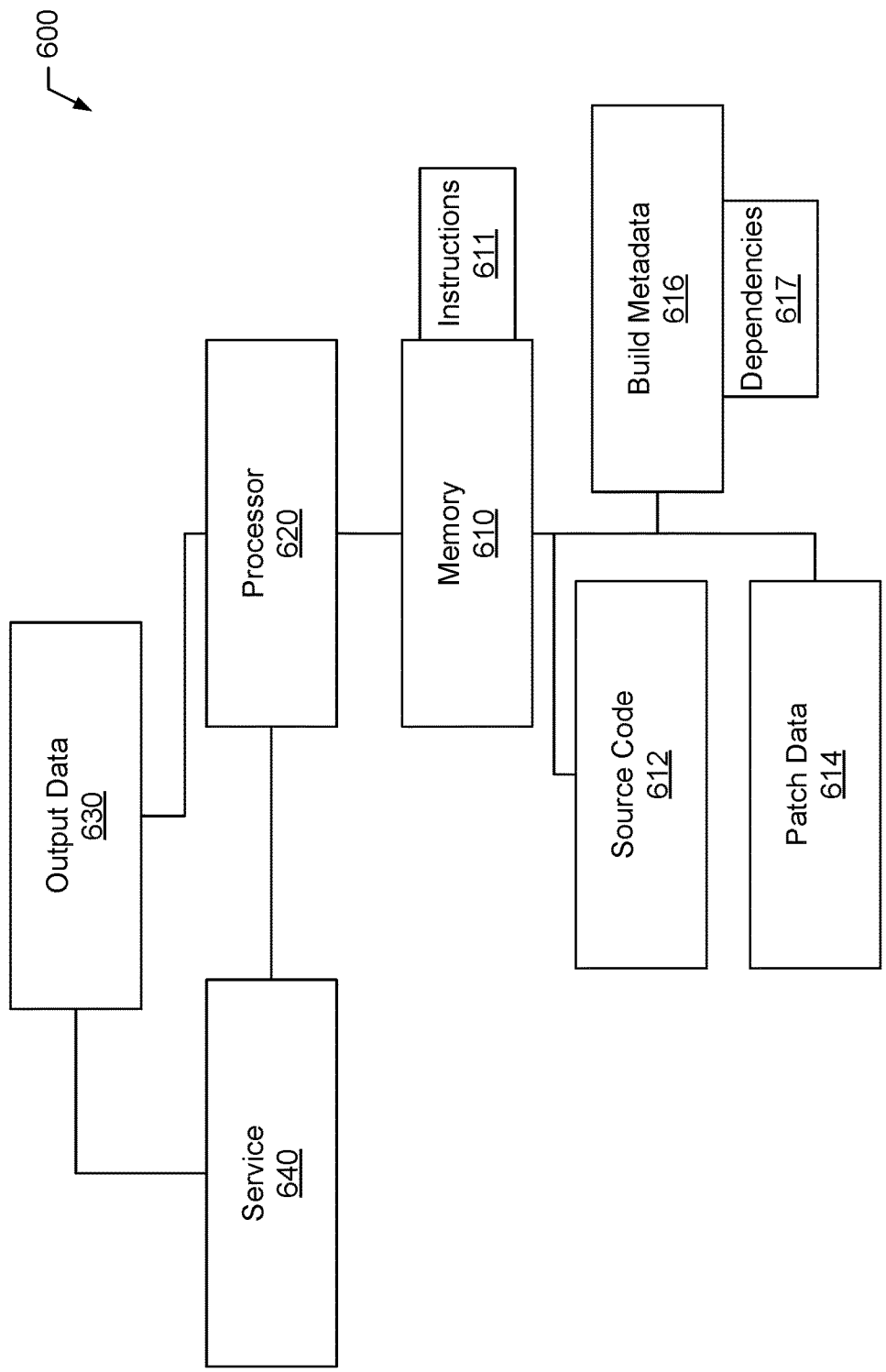
FIG. 6 illustrates a block diagram of an example system according to an example aspect of the present disclosure.

FIG. 6 illustrates a block diagram of an example system according to an example aspect of the present disclosure. The system 600 includes a memory 610 and a processor 620 in communication with the memory 610. The memory 610 can store instructions 611 that, when executed by the processor 620, cause the system to perform a variety of processes as described herein. The instructions 611 can be embodied in computer-usable or readable data and include computer-executable instructions, such as in one or more program modules, executed by one or more computing devices as described herein. Program modules can include routines, programs, objects, components, data structures, and the like that perform particular tasks or implement particular abstract data types when executed by a processor. The modules may be written in a programming language that is subsequently compiled or interpreted for execution. Particular data structures may be used to more effectively implement one or more aspects discussed herein, and such data structures are contemplated within the scope of computer executable instructions and computer-usable data described herein.

The memory 610 can store, and the processor 620, can obtain source code 612, patch data 614, and/or build metadata 616 as described herein. The build metadata can indicate one or more dependencies 617 as described herein. The processor 620 can modify (e.g. patch) one of more of the dependencies 617 based on the patch data 614 as described herein. For example, the patch data 614 can provide a list of dependencies that resolve one or more security vulnerabilities in one or more of the dependencies 617. The processor 620 can replace one or more of the dependencies 617 with the corresponding dependency in patch data 614. The processor 620 can use the source code 612 and patched build data 616 to generate output data 630 as described herein. For example, the build metadata 616 can include a variety of instructions to compile source code 612, based on dependencies 617, into object code such as executable code, library code, and/or any other output data as described herein.

In several aspects, the processor 620 can provide service 640 based on output 630. For example, output data 630 can include an executable program compiled based on the source code 612 and the build metadata 616, with updated dependencies 617 generated using patch data 614. The dependencies 617 can be updated to address a variety of issues, such as security vulnerabilities, as described herein. The processor 620 can execute the executable program to provide service 640. In several aspects, the processor 620 can transmit the output data 630 to a different computing device (such as a remote server system and/or cloud infrastructure) that provides the service 640. For example, the processor 620 can transmit output data 630 to a cloud-based service provider that provides service 640 by loading one or more aspects of output data 630 into one or more processes hosted by the cloud-based service provider. In a variety of examples, the cloud-based service provider provides a web service (or any other API) that can be invoked by the processor 620 to obtain the output data 630 and/or provide the service 640.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A computer-implemented method comprising:
    obtaining, at a client device, source code and build metadata from a server, wherein the build metadata comprises a plurality of dependencies;
    obtaining patch data indicating at least one common vulnerability and exposure (CVE) identifying an issue associated with at least one dependency of the plurality of dependencies, wherein the patch data further indicates (i) a plurality of versions of the at least one dependency and compatibility between the plurality of versions of the at least one dependency and (ii) one or more versions of the plurality of versions of the at least one dependency that correct the issue identified by the at least one CVE;
    identifying, based on the compatibility, a version of the plurality of versions of the at least one dependency that corrects the issue identified by the at least one CVE;
    updating the build metadata to replace the at least one dependency in the plurality of dependencies with the identified version based on the patch data;
    generating output data based on the source code and the updated build metadata;
    generating summary data for the updated build metadata, wherein the summary data comprises an indication of the at least one CVE and an identifier or uniform resource locator (URL) that references a database describing the at least one CVE;
    providing the generated summary data; and
    using the output data to provide a microservice which is deployed to update an application without having to redeploy the application.

2. The computer-implemented method of claim 1, wherein:
    the build metadata comprises instructions to generate a plurality of versions of the application based on the source code and the plurality of dependencies; and
    the output data comprises a first version of the application selected from the plurality of versions of the application.

3. The computer-implemented method of claim 2, wherein a first subset of dependencies for the first version of the application differ from a second subset of dependencies for a second version of the application, both the first version of the application and the second version of the application indicated in the plurality of versions of the application and the first subset of dependencies and second subset of dependencies indicated in the plurality of dependencies.

4. The computer-implemented method of claim 1 further comprising transmitting the output data to a third-party server system configured to provide, based on the output data, at least one service.

5. The computer-implemented method of claim 4, wherein the output data updates a portion of the at least one service and is deployed by the third-party server system without redeploying the at least one service.

6. A computer-implemented method comprising:
    obtaining at a client device, from a data repository server system, source code, build metadata, and patch data, wherein the build metadata comprises a plurality of dependencies and the patch data comprises an indication of a plurality of updated dependencies and binary copies of the plurality of updated dependencies, wherein the patch data further indicates at least one common vulnerability and exposure (CVE) identifying an issue associated with at least one dependency of the plurality of dependencies, wherein the patch data further indicates (i) a plurality of versions of the at least one dependency and compatibility between the plurality of versions of the at least one dependency and (ii) one or more versions of the plurality of versions of the at least one dependency that correct the issue identified by the at least one CVE;
    identifying, based on the compatibility, a version of the plurality of versions of the at least one dependency that corrects the issue identified by the at least one CVE;
    updating the build metadata to replace the at least one dependency in the plurality of dependencies with the identified version based on the patch data;
    generating output data based on the source code, the updated build metadata, and the binary copies of the updated dependencies indicated in the updated build metadata;
    generating summary data for the updated build metadata, wherein the summary data comprises an indication of the at least one CVE and an identifier or uniform resource locator (URL) that references a database describing the at least one CVE; and
    providing a service based on the output data, wherein the service is a microservice, and the microservice is deployed to update an application without having to redeploy the application.

7. The computer-implemented method of claim 6, wherein:
the build metadata comprises instructions to generate a plurality of versions of the service based on the source code and the plurality of dependencies; and
the output data comprises a first version of the service selected from the plurality of versions of the service.

8. The computer-implemented method of claim 7, wherein a first subset of dependencies for the first version of the service differ from a second subset of dependencies for a second version of the service, both the first version of the service and the second version of the service indicated in the plurality of versions of the service and the first subset of dependencies and second subset of dependencies indicated in the plurality of dependencies.

9. The computer-implemented method of claim 6, wherein the output data updates a portion of the provided service.

10. The computer-implemented method of claim 9, wherein the service is updated based on the output data without redeploying the service.

11. The computer-implemented method of claim 6 further comprising:
identifying a subset of the plurality of dependencies in the build metadata based on a corresponding subset of the plurality of updated dependencies in the patch data, wherein each dependency in the build metadata indicates a first version and each updated dependency in the patch data indicates a second version that supersedes and is compatible with the first version; and
updating the build metadata by updating each dependency of the subset of the plurality of dependencies with a binary copy of the second version of the updated dependency in the plurality of updated dependencies.

12. An apparatus comprising:
a processor; and
a memory in communication with the processor and storing instructions that, when executed by the processor, cause the apparatus to:
obtain, at a client device, source code and build metadata from a data repository server system, wherein the build metadata comprises a plurality of dependencies;
obtain patch data indicating at least one common vulnerability and exposure (CVE) identifying an issue associated with at least one dependency of the plurality of dependencies, wherein the patch data further indicates (i) a plurality of versions of the at least one dependency and compatibility between the plurality of versions of the at least one dependency and (ii) one or more versions of the plurality of versions of the at least one dependency that correct the issue identified by the at least one CVE;
identify, based on the compatibility, a version of the plurality of versions of the at least one dependency that corrects the issue identified by the at least one CVE;
update the build metadata to replace the at least one dependency in the plurality of dependencies with the identified version based on the patch data;
generate output data based on the source code and the updated build metadata;
generate summary data for the updated build metadata indicating at least one CVE and an identifier or uniform resource locator (URL) that references a database describing the at least one identified CVE; and
provide a service based on the output data, wherein the service is a microservice, and the microservice is deployed to update an application without having to redeploy the application.

13. The apparatus of claim 12, wherein the instructions, when executed by the processor, further cause the apparatus to:
provide the summary data.

14. The apparatus of claim 12, wherein:
the build metadata comprises instructions to generate a plurality of versions of the service based on the source code and the plurality of dependencies; and
the output data comprises a first version of the service selected from the plurality of versions of the service.

15. The apparatus of claim 12, wherein:
the output data comprises a patch to a portion of the service; and
the instructions, when executed by the processor, further cause the apparatus to modify the service based on the output data and while the service is being provided.

16. The apparatus of claim 12, wherein the instructions, when executed by the processor, further cause the apparatus to update the build metadata by replacing the at least one dependency with a corresponding updated dependency indicated in the patch data, the at least one dependency having a first version and the corresponding updated dependency having a second version that supersedes the first version and is compatible with the first version.

17. The apparatus of claim 12, wherein the instructions, when executed by the processor, cause the apparatus to obtain the patch data from a patch server system.

\* \* \* \* \*